US010535852B2

(12) United States Patent
Callahan et al.

(10) Patent No.: US 10,535,852 B2
(45) Date of Patent: Jan. 14, 2020

(54) CHASSIS FOR RECHARGEABLE BATTERY

(71) Applicant: The Boeing Company, Chicago, IL (US)

(72) Inventors: Kevin S. Callahan, Shoreline, WA (US); Bruce L. Drolen, Altadena, CA (US); James C. Russell, Bellevue, WA (US); John R. Lowell, Fairfax, VA (US); Thomas P. Barrera, Long Beach, CA (US); Timothy R. North, Dickinson, TX (US)

(73) Assignee: The Boeing Company, Chicago, IL (US)

( * ) Notice: Subject to any disclaimer, the term of this patent is extended or adjusted under 35 U.S.C. 154(b) by 545 days.

(21) Appl. No.: 14/188,667

(22) Filed: Feb. 24, 2014

(65) Prior Publication Data

US 2014/0242425 A1    Aug. 28, 2014

Related U.S. Application Data

(60) Provisional application No. 61/769,338, filed on Feb. 26, 2013, provisional application No. 61/769,348, filed on Feb. 26, 2013.

(51) Int. Cl.
*H01M 2/10* (2006.01)
*H01M 2/12* (2006.01)

(52) U.S. Cl.
CPC ................ *H01M 2/1241* (2013.01)

(58) Field of Classification Search
CPC ...... H01M 2/36; H01M 2/1241; H01M 10/50; H01M 2/10; H01M 2/12

USPC ....... 429/56, 72, 87, 96–100, 120, 152–155, 429/158–161, 148
See application file for complete search history.

(56) References Cited

U.S. PATENT DOCUMENTS

| 1,330,634 | A | * | 2/1920 | Ivey et al. | .............. 429/95 |
| 5,392,873 | A | | 2/1995 | Masuyama et al. | |
| 6,189,635 | B1 | * | 2/2001 | Schuler | ......... B60R 16/04 |
| | | | | | 180/65.1 |
| 6,255,015 | B1 | * | 7/2001 | Corrigan et al. | ............. 429/149 |
| 7,507,500 | B2 | * | 3/2009 | Donnelly | ............. B60L 3/0046 |
| | | | | | 429/120 |
| 8,916,282 | B1 | * | 12/2014 | Bohman et al. | .............. 429/120 |
| 2003/0077505 | A1 | * | 4/2003 | Goda et al. | .............. 429/56 |

(Continued)

FOREIGN PATENT DOCUMENTS

| CN | 102347509 A | 2/2012 |
| EP | 2413421 A1 | 2/2012 |

(Continued)

OTHER PUBLICATIONS

"Definition of 'channel'". Collins Dictionary. <http://www.collinsdictionary.com/dictionary/american/channel>.*

(Continued)

*Primary Examiner* — James Lee
(74) *Attorney, Agent, or Firm* — Miller, Matthias & Hull LLP (57) ABSTRACT

A rechargeable battery comprises a chassis including a lower fixation plate, and a plurality of battery cells on the lower fixation plate. The lower fixation plate includes at least one flow channel positioned to collect condensate from the battery cells and move the collected condensate away from the battery cells.

20 Claims, 6 Drawing Sheets

(56) References Cited

U.S. PATENT DOCUMENTS

| | | | | |
|---|---|---|---|---|
| 2008/0254359 A1* | 10/2008 | Byun | ............... | H01M 10/46 |
| | | | | 429/163 |
| 2009/0241442 A1* | 10/2009 | MacLean | ............ | A01K 1/0103 |
| | | | | 52/220.3 |
| 2010/0183910 A1* | 7/2010 | Nishino | ............ | H01M 10/0431 |
| | | | | 429/163 |
| 2011/0159340 A1* | 6/2011 | Hu et al. | ................ | 429/120 |
| 2012/0189886 A1* | 7/2012 | Tsumaki et al. | ............ | 429/87 |
| 2013/0149583 A1* | 6/2013 | Kurita | ............ | H01M 2/1077 |
| | | | | 429/120 |
| 2013/0252059 A1 | 9/2013 | Choi et al. | | |

FOREIGN PATENT DOCUMENTS

| | | | |
|---|---|---|---|
| EP | 2475023 | A | 7/2012 |
| EP | 2475023 | A1 | 7/2012 |
| GB | 676332 | | 7/1952 |
| GB | 676332 | A | 7/1952 |
| JP | H05193366 | A | 8/1993 |
| JP | 2002184364 | A | 6/2002 |
| JP | 2012033419 | A | 2/2012 |
| JP | 2012079510 | A | 4/2012 |
| JP | 2013089449 | A | 5/2013 |
| JP | 2013201112 | A | 10/2013 |
| JP | 2014165004 | A | 9/2014 |

OTHER PUBLICATIONS

Office Action for related Chinese Application No. 2014800107454; dated Mar. 1, 2017.

Office Action for related Chinese Application No. 2015-559315; dated Jan. 23, 2018.

* cited by examiner

CHASSIS FOR RECHARGEABLE BATTERY

This application claims the benefit of provisional application 61/769,338 filed 26 Feb. 2013, and provisional application 61/769,348 filed 26 Feb. 2013, both of which are incorporated herein by reference.

BACKGROUND

Lithium-ion (Li-ion) batteries (LIBs) are desirable for mobile computing devices, certain automobiles, and certain aircraft. They have lower weight and higher energy density than rechargeable batteries such as nickel metal hydride and nickel cadmium batteries. They have no memory degradation.

However, certain lithium-ion batteries have longstanding issues with thermal runaway. As used herein, thermal runaway means a situation where an increase in temperature causes a further increase in temperature that may lead to decreased efficiency. For example, heat generated from an exothermic chemical reaction may increase the rate of the chemical reaction. Designers of complex systems may address such inefficiencies in various ways.

SUMMARY

According to an embodiment herein, a rechargeable battery comprises a chassis including a lower fixation plate, and a plurality of battery cells on the lower fixation plate. The lower fixation plate includes at least one flow channel positioned to collect condensate from the battery cells and move the collected condensate away from the battery cells.

According to another embodiment herein, a battery comprises an array of prismatic rechargeable battery cells having rupture plates, and a chassis including a frame with vent holes, and a lower fixation plate on the frame. The battery cells are located on the lower fixation plate and oriented with the rupture plates coincident with the vent holes. The lower fixation plate has a plurality of drainage holes. Each drainage hole is underneath corners of at least two of the battery cells.

According to another embodiment herein, a battery system comprises a battery enclosure having walls that define a cavity, and a battery mounted within the cavity and spaced apart from the walls. The battery includes a plurality of rechargeable battery cells, and a chassis for the battery cells. The chassis includes a lower fixation plate for supporting the battery cells. The lower fixation plate has drain holes for draining condensate into a portion of the cavity below the battery.

These features and functions may be achieved independently in various embodiments or may be combined in other embodiments. Further details of the embodiments can be seen with reference to the following description and drawings.

DETAILED DESCRIPTION

Figure 1:
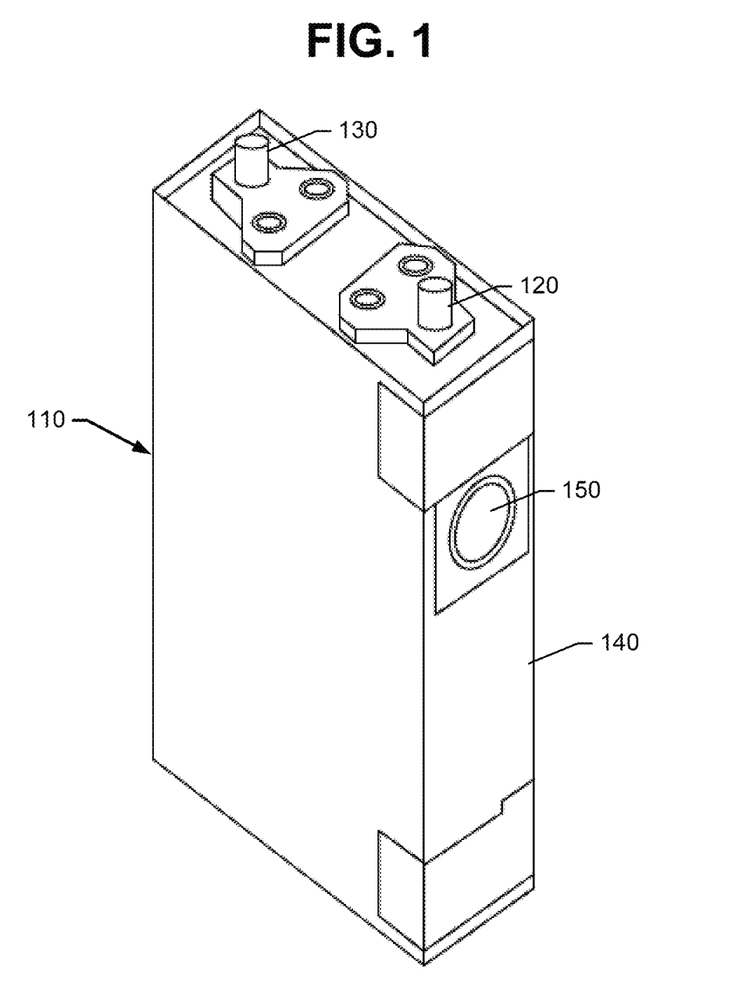
FIG. 1 is an illustration of a rechargeable battery cell.

Reference is made to FIG. 1, which illustrates a rechargeable battery cell 110. The battery cell 110 includes positive and negative electrodes 120 and 130, a case 140 for the electrodes 120 and 130, and electrolyte (not shown) sealed within the case 140.

The battery cell 110 is not limited to any particular chemistry. Examples include, but are not limited to lithium-ion, metal-cadmium, and nickel metal hydride. Depending on the battery chemistry, the battery cell 110 may be susceptible to thermal runaway.

The battery cell 110 has a vent hole (not shown) at the side of its case 140, and a rupture plate 150 covering the vent hole. The rupture plate 150 may be a stainless steel membrane that is resistance welded to the case 140. The rupture plate 150 is designed to open at a predetermined internal cell pressure (which may be caused by thermal runaway) and uncover the vent hole. Once the vent hole has been uncovered, materials from inside the case 140 may be expelled through the vent hole.

The battery cell 110 is not limited to any particular geometry. For example, the battery cell may 110 be prismatic or cylindrical (FIG. 1 shows a battery cell 110 that is prismatic).

Figure 2:
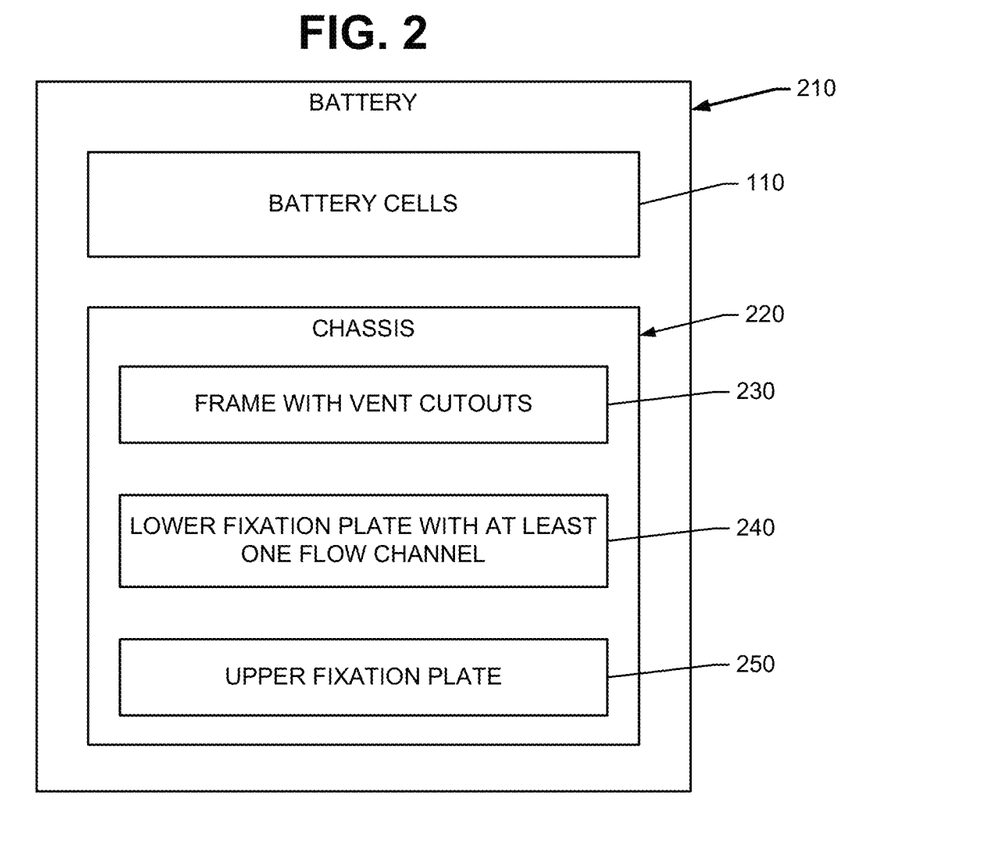
FIG. 2 is an illustration of a rechargeable battery.

Reference is made to FIG. 2, which illustrates a rechargeable battery 210 including a chassis 220 and multiple battery cells 110. For the purposes herein, the chassis 220 includes a metal frame 230, a lower fixation plate 240, and an upper fixation plate 250. The lower fixation 240 plate is located at the bottom of the frame 230, the battery cells 110 are located on the lower fixation plate 240, and the upper fixation plate 250 is located over the battery cells 110 to restrain the battery cells 110 within the frame 230. The lower and upper fixation plates 240 and 250 may be constructed of a non-conductive material so as to avoid case-to-case 140 shorting.

The battery 210 may be subject to chronic moisture ingress. For instance, the battery 210 may be used in a commercial aircraft, where it is exposed to a high humidity environment. Condensate may form on the cases 140 of the battery cells 110.

The lower fixation plate 240 includes at least one flow channel positioned to collect condensate from the battery cell 110 and move the collected condensate away from the battery cell 110 and off the chassis 220. Each flow channel prevents condensate from pooling on the lower fixation plate 240. This, in turn, prevents short circuit paths from forming between the cases 140 of the battery cells 110.

Each battery cell 110 is oriented with its rupture plate 150 facing the frame 230. The frame 230 has a vent cutout for each battery cell 110. The vent cutout is coincident with the rupture plate 150 of its corresponding battery cell 110. In the event a rupture plate 150 is opened, material expelled through the uncovered vent hole will flow through the vent cutout and off the chassis 220.

Capacity and power of the battery 210 are dictated by the type of platform for which the battery 210 is intended. In some embodiments, the battery 210 may include lithium-ion cells 110, and the battery 210 may be configured for a passenger vehicle (e.g., aircraft, automobile, truck, bus, train, or boat).

Figure 3:
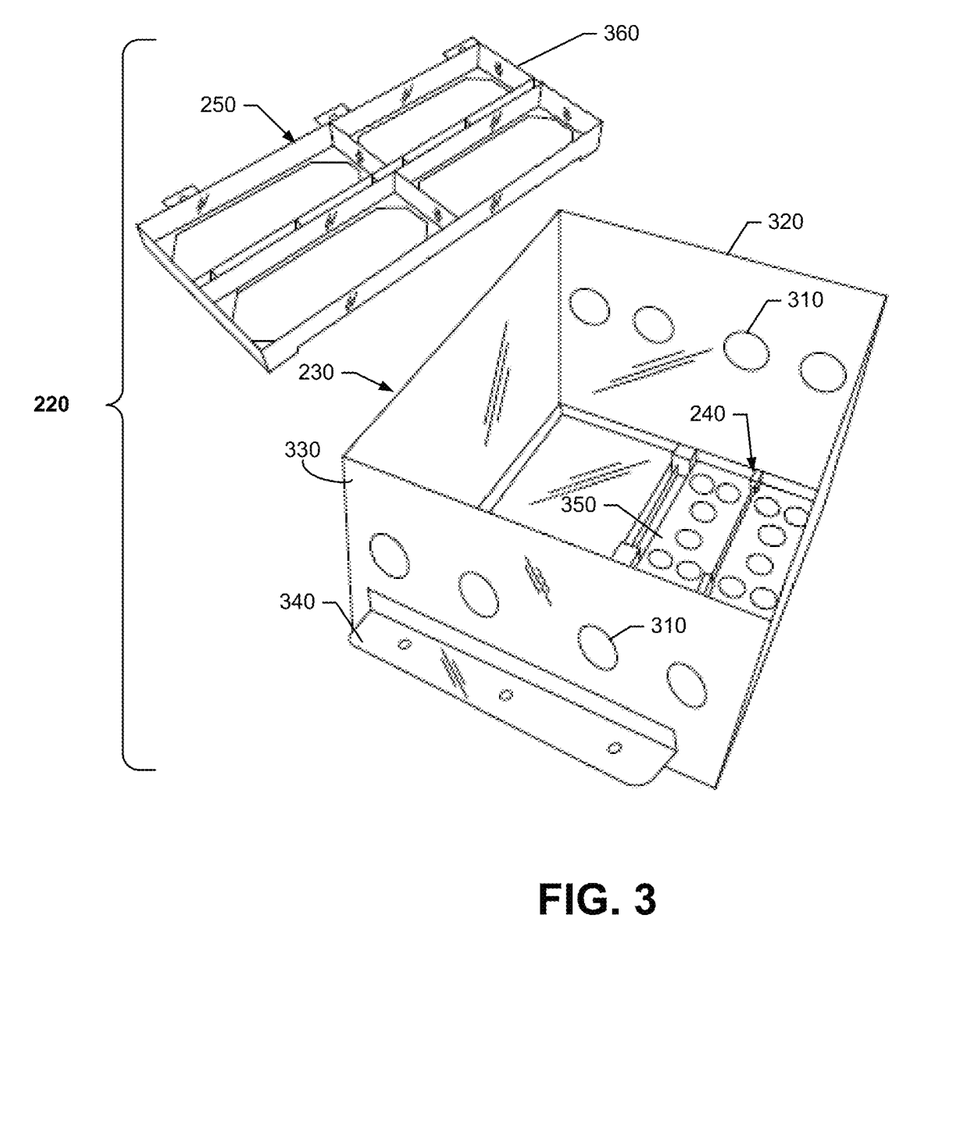
FIG. 3 is an illustration of a chassis for a rechargeable battery.

Reference is now made to FIG. 3, which illustrates an example of a chassis 220 for a rechargeable battery 210. In this example, the chassis 220 can accommodate eight battery cells arranged in two rows. Vent cutouts 310 are provided on opposite walls 320 and 330 of a metal frame 230. Mounting flanges 340 may be attached to exterior surfaces of the opposite walls 320 and 330.

A lower fixation plate 240 is shown at the bottom of the frame 230. The lower fixation plate 240 includes multiple segments 350 that are arranged side by side. The upper fixation plate 250 includes corresponding segments 360.

Eight battery cells 110 are placed on the segments 350 of the lower fixation plate 240 such that the rupture plates 150 are coincident with the vent cutouts 310. The segments 360 of the upper fixation plate 250 are then placed over the battery cells 110 and fastened to the walls 320 and 330. Anode and cathode studs extending vertically from the top of the battery cells 110 are connected with copper bus bars to form a series connection (the $n^{th}$ cell's anode is connected to the $n+1^{th}$ cell's cathode).

Figure 4A:
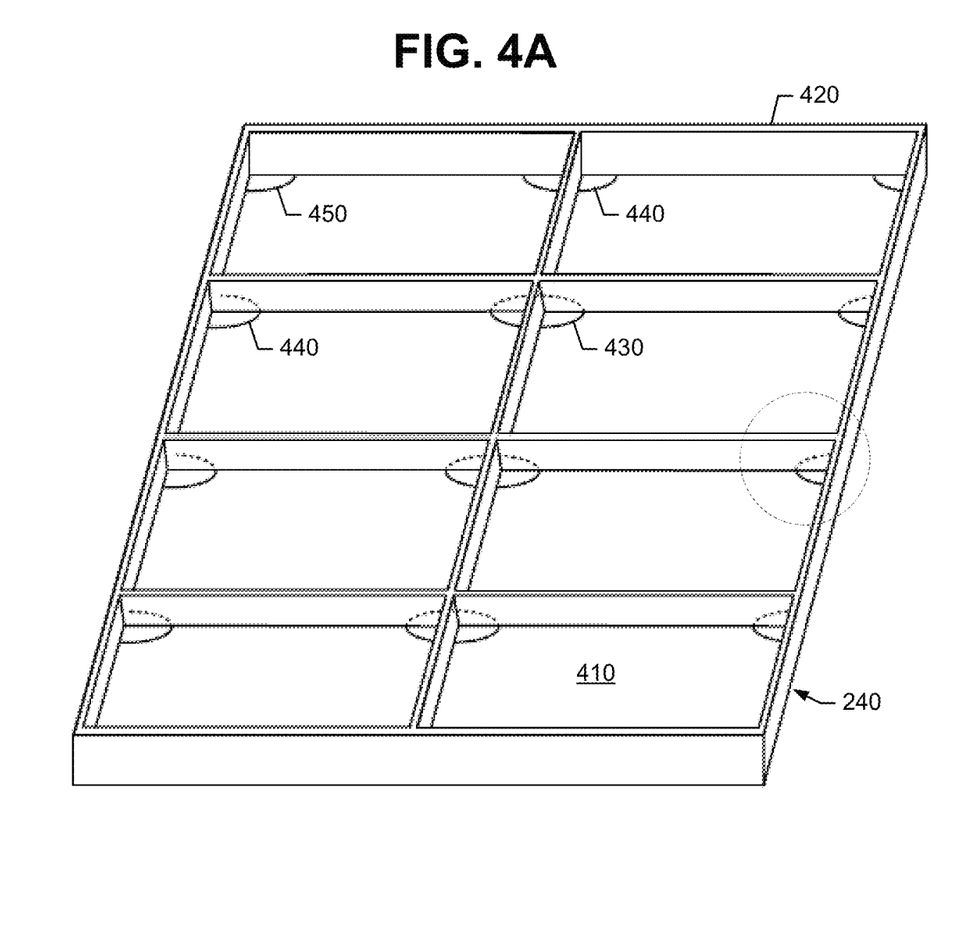
FIGS. 4A and 4B are illustrations of a lower fixation plate of the chassis.
Figure 4B:
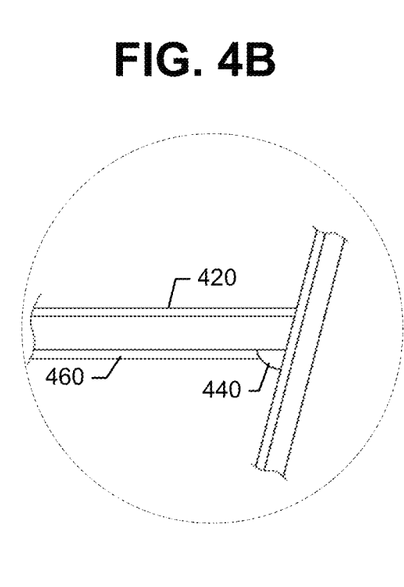

FIGS. 4A and 4B illustrate examples of flow channels in the lower fixation plate 240. Referring to FIG. 4A, the lower fixation plate 240 includes a substrate 410, and a lattice of cell dividers 420 on the substrate 410. The substrate 410 and the cell dividers 420 may be made of an electrically non-conductive material. The cell dividers 420 may rise about a half inch above the substrate 410. The battery cells are located between the cell dividers 420.

The flow channels include drainage holes 430, 440 and 450 extending through the substrate 410. Some of the drainage holes 430 and 440 may be located beneath portions of at least two battery cells. In FIG. 4A, each drainage hole 430 is located at the intersection of two cell dividers 420. This ensures that each drainage hole 430 is beneath the corners of four adjacent battery cells.

The other drainage holes 440 and 450 are at a periphery of the substrate 410. Some of those drainage holes 440 are located beneath cell dividers 420, where they are beneath the corners of two adjacent battery cells. The remaining drainage holes 450 at the periphery may be located in the corners of the substrate 410.

Additional reference is made to FIG. 4B. The flow channels may further include grooves 460 in the substrate 410. The grooves 460 extend between drainage holes 430-450. The grooves 460 may be sloped to cause the collected condensate to flow to the drainage holes 430-450. The grooves 460 may extend along the cell dividers 420.

Condensate from the battery cells falls onto the substrate 410 and is collected in the grooves 460. Gravity causes the collected condensate to flow towards the drainage holes 430-450, and flow through the drainage holes and off the lower fixation plate 240. Openings (not shown) in the bottom of the frame 230 allow the condensate to flow off the chassis 220. Thus, the flow channels 430-460 prevent condensate from pooling on the substrate 410.

Figure 5:
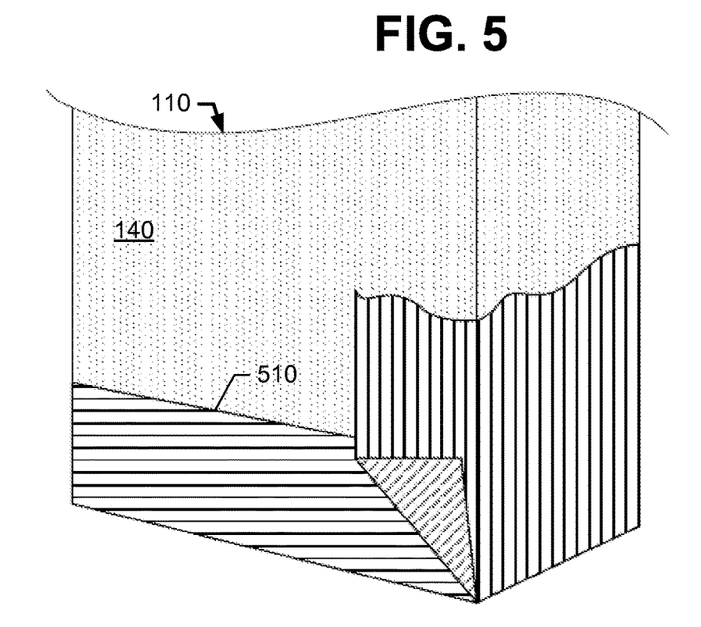
FIG. 5 is an illustration of a battery cell wrapped in a polyimide film.

Reference is now made to FIG. 5. The battery 210 may include other features that prevent short circuit paths from forming between battery cells 110. For instance, the case 140 of each battery cell 110 may be wrapped with a polyimide film 510 such as Kapton® tape. The purpose of the polyimide film 510 is to prevent moisture from conducting current between the surfaces of adjacent battery cells 110.

Figure 6:
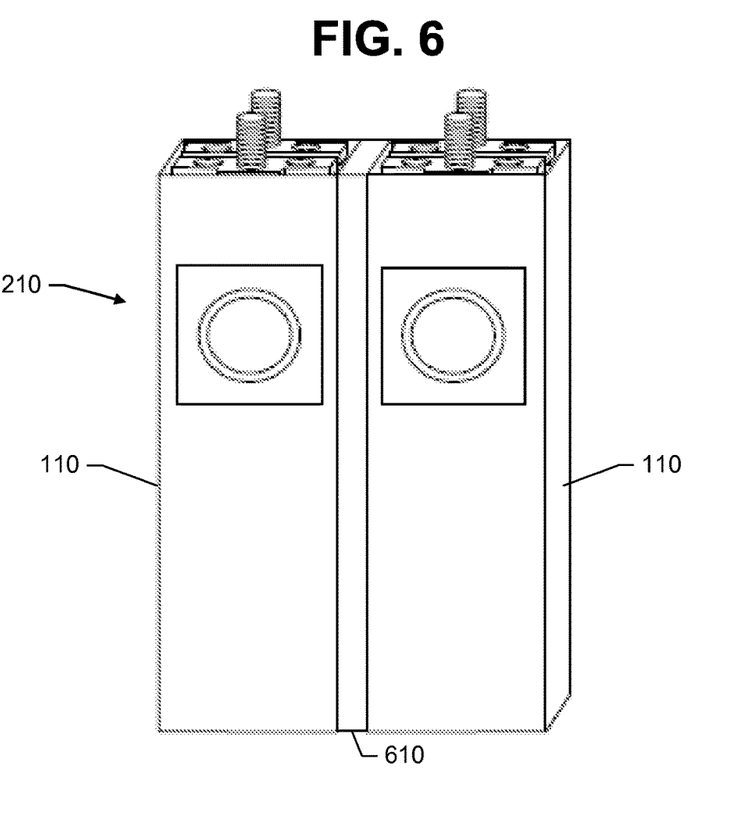
FIG. 6 is an illustration of adjacent battery cells separated by a dielectric separator.

Reference is now made to FIG. 6. The battery 210 may also include dielectric separators 610 between opposing faces of the battery cells 110. The dielectric separators 610 may be located above the cell dividers. The dielectric separators 610 have a thickness and composition that creates thermal barriers between opposing surfaces of the battery cells 110. The dielectric separators 610 prevent thermal runaway from propagating from one of the battery cells 110 to neighboring battery cells 110. The composition of the dielectric separators 610 may be a fiber composite such as glass fiber phenolic (plies of fiberglass reinforcing fibers in a resin).

Figure 7:
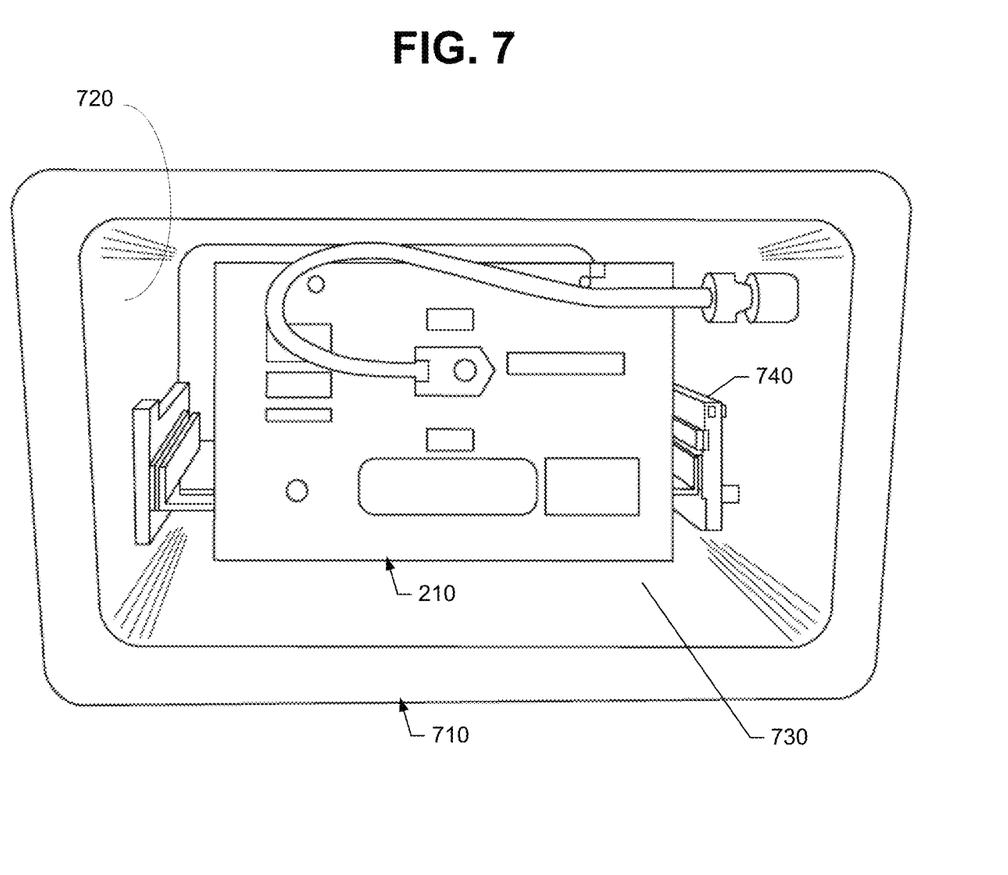
FIG. 7 is an illustration of a battery enclosure and a rechargeable battery inside the enclosure.

Reference is now made to FIG. 7, which illustrates a steel enclosure 710 for the battery 210. The enclosure 710 has walls 720 that define a cavity 730. The battery 210 is mounted within the cavity 730 and spaced apart from the walls 720. For instance, the battery 210 may be mounted to opposing walls 720 by slider rails 740. The slider rails 740 may be made of an electrically non-conductive material so as to electrically isolate the battery 210 from the walls 720. The slider rails 740 enable the battery to be slid in and out of the cavity 730.

Volume of the cavity 730 is greater than volume of the battery 210. Spacing of the battery 210 from the walls 720 allows condensate drained from the chassis to be captured in a portion of the cavity 730 below the battery 210. Material expelled through the vent holes in the chassis 220 is captured in the space between the battery 210 and the walls 720.

The invention claimed is:

1. A rechargeable battery comprising:
    a chassis including a lower fixation plate having a substrate divided into a plurality of segments; and
    a plurality of battery cells supported by the substrate of the lower fixation plate with a single battery cell disposed on each segment;
    wherein the substrate is a non-conductive material, and defines at least one flow channel in each segment positioned to collect condensate from the battery cells and move the collected condensate away from the battery cells;
    wherein the chassis further includes an upper fixation plate configured to hold the battery cells within the chassis; the upper fixation plate having a plurality of segments corresponding to those of the lower fixation plate; and
    wherein the upper fixation plate is constructed of a non-conductive material.

2. The battery of claim 1, wherein the at least one flow channel is configured to drain the collected condensate off the chassis.

3. The battery of claim 1, wherein the at least one flow channel includes drainage holes in the substrate, each drainage hole located beneath portions of at least two battery cells.

4. The battery of claim 3, wherein the lower fixation plate includes additional drainage holes at a periphery of the substrate.

5. The battery of claim 3, wherein the at least one flow channel further includes grooves in the substrate, the grooves extending between the drainage holes.

6. The battery of claim 5, wherein the grooves are sloped to cause the collected condensate to flow to the drainage holes.

7. The battery of claim 3, wherein the battery cells are prismatic and are arranged in a grid; and wherein each drainage hole is located beneath corners of four adjacent battery cells.

8. The battery of claim 7, wherein the lower fixation plate further includes a lattice of cell dividers on the substrate, the battery cells located between the cell dividers; and wherein the at least one flow channel further includes grooves in the substrate, the grooves extending between the drainage holes, along the cell dividers.

9. The battery of claim 1, wherein each battery cell is wrapped with a polyimide film.

10. The battery of claim 1, wherein a side of each battery cell includes a rupture plate; wherein the chassis further includes a frame having cutouts; and wherein the battery cells are oriented such that their rupture plates are aligned with the frame cutouts.

11. The battery of claim 1, further comprising dielectric separators between opposing faces of the battery cells, the dielectric separators made of a fiber composite.

12. The battery of claim 1, wherein the battery cells are lithium-ion battery cells; and wherein the battery is configured for passenger vehicles.

13. A battery system comprising a metal battery enclosure having walls that define a cavity; and the battery of claim 1 mounted within the cavity and spaced apart from the walls such that condensate drained from the chassis is captured in a portion of the cavity below the battery.

14. The battery system of claim 13, wherein the enclosure includes slide rails, made of electrically non-conductive material, for mounting the battery to opposing walls of the cavity.

15. A battery comprising:
an array of prismatic rechargeable battery cells having rupture plates; and
a frame having sidewall plates with vent holes, and a lower fixation plate having a substrate divided into a plurality of segments, the battery cells supported by the substrate of the lower fixation plate with a single battery cell disposed on each segment, the battery cells oriented with the rupture plates aligned with the vent holes, the substrate is a non-conductive material, and defines at least one drainage hole in each segment, each drainage hole underneath corners of at least two of the battery cells;
wherein the chassis further includes an upper fixation plate configured to hold the battery cells within the chassis; the upper fixation plate having a plurality of segments corresponding to those of the lower fixation plate; and
wherein the upper fixation plate is constructed of a non-conductive material.

16. The battery of claim 15, wherein the lower fixation plate further includes a lattice of cell dividers on the substrate, the battery cells located between the cell dividers; and wherein the lower fixation plate further includes grooves extending between drainage holes, along the cell dividers.

17. The battery of claim 15, wherein each battery cell is wrapped with a polyimide film.

18. A battery system comprising:
a battery enclosure having walls that define a cavity; and
a battery mounted within the cavity and spaced apart from the walls, the battery including a plurality of rechargeable battery cells, and a chassis for the battery cells, the chassis including a non-conductive lower fixation plate having a substrate divided into a plurality of segments for supporting the battery cells, the battery cells supported by the substrate and with a single battery cell disposed on each segment, the substrate defining drain holes for draining condensate into a portion of the cavity below the battery;
wherein the chassis further includes an upper fixation plate configured to hold the battery cells within the chassis; the upper fixation plate having a plurality of segments corresponding to those of the lower fixation plate; and
wherein the upper fixation plate is constructed of a non-conductive material.

19. The battery system of claim 18, wherein the lower fixation plate includes a substrate and a lattice of cell dividers on the substrate, the battery cells located between the cell dividers; and wherein the lower fixation plate further includes grooves extending between drainage holes, along the dividers.

20. The battery system of claim 18, wherein a side of each battery cell includes a rupture plate; wherein the chassis further includes a frame having cutouts; and wherein the battery cells are oriented such that their rupture plates are aligned with the frame cutouts such that material expelled from any battery cell will enter space between the battery and the walls.

* * * * *